No. 772,481. PATENTED OCT. 18, 1904.
D. H. TALBERT.
COFFEE POT.
APPLICATION FILED FEB. 17, 1904.
NO MODEL. 2 SHEETS—SHEET 1.
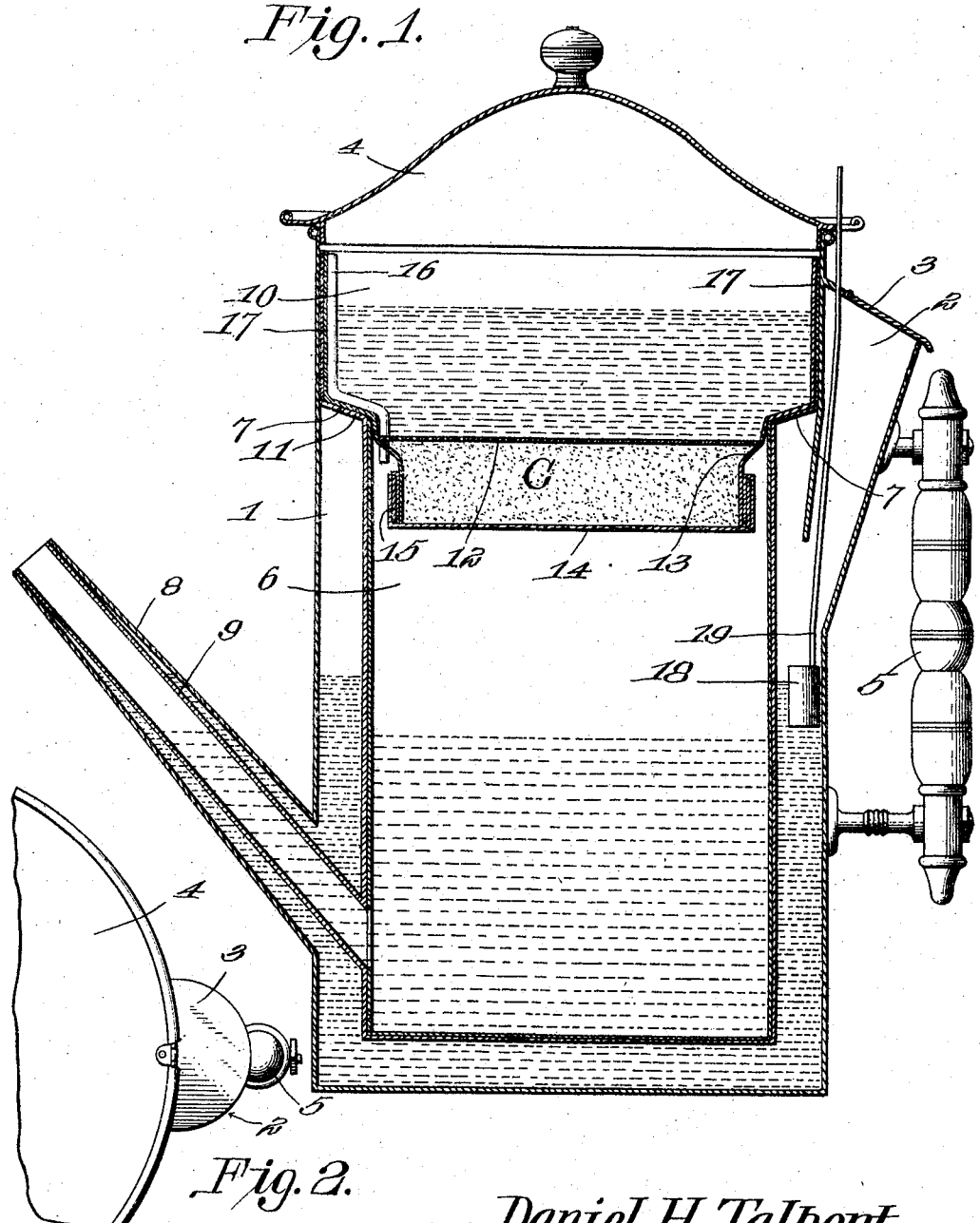
Daniel H. Talbert, Inventor.

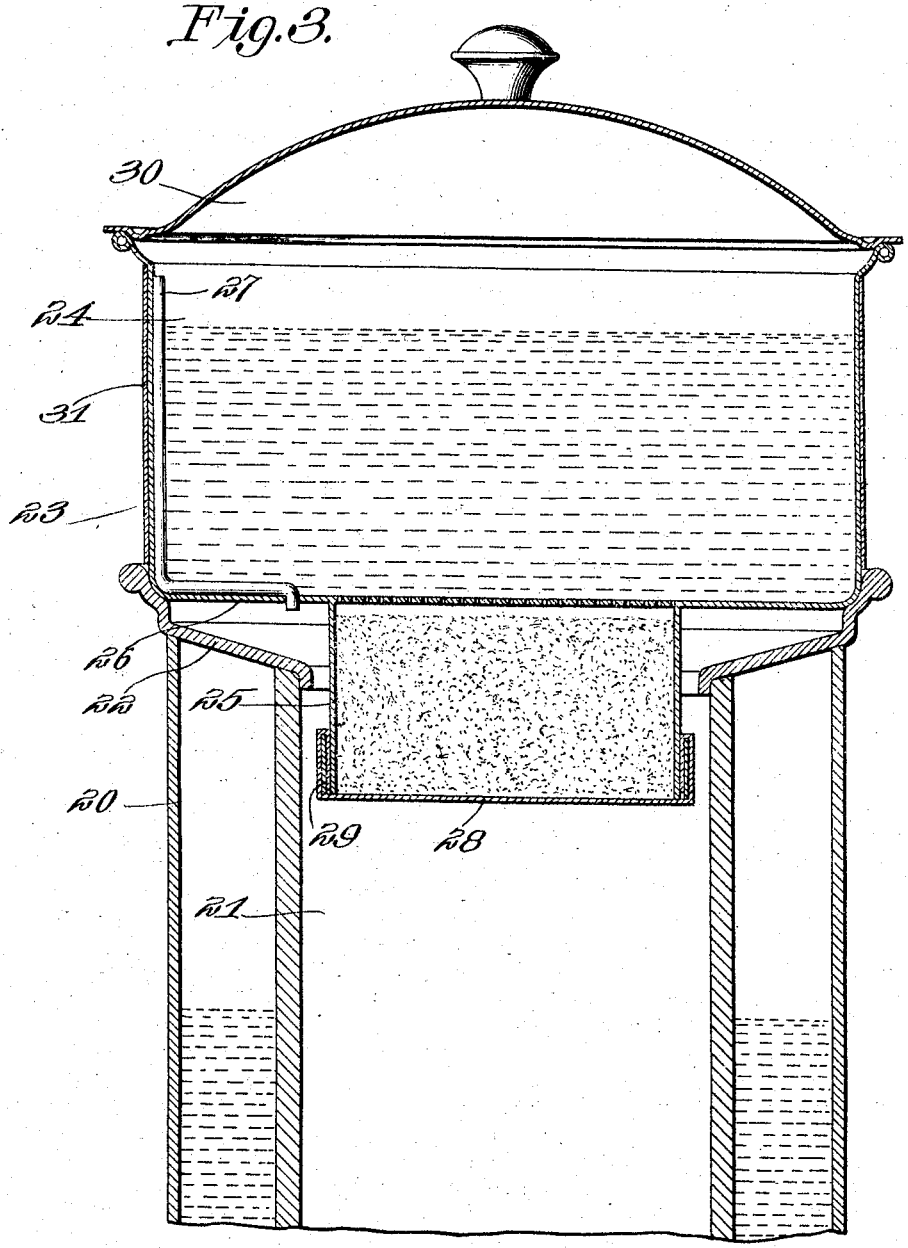

No. 772,481. Patented October 18, 1904.

UNITED STATES PATENT OFFICE.

DANIEL H. TALBERT, OF INDIANAPOLIS, INDIANA.

COFFEE-POT.

SPECIFICATION forming part of Letters Patent No. 772,481, dated October 18, 1904.

Application filed February 17, 1904. Serial No. 194,086. (No model.)

*To all whom it may concern:*

Be it known that I, DANIEL H. TALBERT, a citizen of the United States, residing at Indianapolis, in the county of Marion and State of Indiana, have invented a new and useful Coffee-Pot, of which the following is a specification.

This invention relates to coffee-pots, and has for its principal object the provision of an improved type of coffee-pot in which means is provided for effectively retaining the heat within the pot for a long period of time, in which means is provided for facilitating the percolation of hot water through the charge of coffee, in which the receiver for the ground coffee is so constructed as to be readily removable from the coffee-pot, and to be conveniently and easily handled both in filling it with fresh coffee and in removing spent coffee and cleansing the receiver after use.

With the objects above mentioned and others in view which will be hereinafter pointed out, I make use of the novel coffee-pot construction hereinafter fully described and claimed, and illustrated in two somewhat different forms of embodiment in the accompanying drawings, it being understood that various changes in the minor structural details may be made without departing from the spirit of the invention or sacrificing the advantages thereof.

In the drawings, Figure 1 is a view in vertical section through the improved coffee-pot. Fig. 2 is a detail view. Fig. 3 is a view in vertical section of a modified form of the invention adapted to serve as an attachment to coffee-urns of ordinary structure.

Referring to the drawings, in which corresponding parts are designated by similar characters of reference, 1 designates the outer casing or jacket of the coffee-pot, which is made of any suitable material, such as some non-corrodible metal, and is preferably of the cylindrical form illustrated. At the back of the casing or jacket 1 I provide a filler 2, through which liquid may be poured into the interior of the casing or jacket, and a cover 3 for the said filler, which is preferably hinged thereto, as shown. Upon the top of the casing 1 the usual removable cover for the pot is provided, as shown at 4, and a handle 5 is attached at its lower end to the casing-wall and at its upper end to the filler 2. Within the outer casing or jacket 1 and spaced therefrom at a sufficient interval I arrange an inner coffee-receptacle 6, which preferably corresponds approximately in contour to the outer casing or jacket and extends from a plane slightly below the cover of the coffee-pot almost to the bottom thereof, being spaced from the bottom to a sufficient extent in order to permit a layer of heated liquid for heat-retaining purposes to be interposed between the inner receptacle and the outer casing. The inner receptacle 6 is preferably enamel or porcelain lined, and at the top the side wall of the receptacle 6 is provided with an outward flange 7, which is secured to the wall of the casing or jacket 1.

The spout of the coffee-pot appears, as seen from the outside, to be of the ordinary construction, but, as may be seen in Fig. 1, it is really composed of an outer wall 8 and an inner tube 9. The outer wall 8, which tapers considerably toward the upper end, is attached at its inner end to the wall of the casing 1, and the interior of the casing communicates with the space inclosed by the wall 8. The tube 9 is of substantially the same diameter throughout its length and is attached at its inner end to the inner receptacle 6, with the interior of which the tube communicates. The outer end of the tube is hermetically sealed by solder or otherwise to the outer end of the wall 8.

The preferred form of receiver or percolator for the coffee is that illustrated in Fig. 1, and it consists of a metal receiver 10, reduced in diameter near the bottom to present a shoulder 11, adapted to rest upon the flange 7 of the receptacle 6 and having a perforated metal plate 12 secured to the receiver near the bottom thereof. The plate 12 rests upon a shoulder 13, formed in the wall of the receiver, which is extended down a short distance below the shoulder to form a chamber for the ground coffee. The coffee C is supported within the chamber by means of a removable bottom for the receiver which consists, preferably, of a piece of cloth 14, of any suitable character, which is carried by a band 15, preferably of metal, adapted to encircle and engage frictionally with the exterior surface of the receiver at its lower end, as seen in Fig. 1.

In order to facilitate the passage of the hot water from the upper portion of the receiver through the charge of coffee and into the coffee-receptacle in the lower portion of the pot, a small tube 16 is provided at one side of the coffee-receiver, the upper end of the tube being substantially at the top of the receiver and the lower end opening below the percolator-plate, so as to afford an unobstructed passage for air from the receptacle 6 to the top of the receiver. By means of this tubular passage the resistance which would otherwise be opposed to the downward passage of the hot water by the air in the receptacle 6 is entirely overcome, and the pressure of the air in the receptacle 6 and in the upper part of the coffee-receiver is equalized.

While the layer of hot water between the outer casing or jacket of the coffee-pot and the inner receptacle 6 is effective to retain the heat in the infusion of coffee within the receptacle 6, this layer of hot water does not, of course, prevent the escape of heat from the hot water in the coffee-receptacle. In order to prevent loss of heat from the water in the coffee-receptacle, it is desirable to provide an outer covering or wrapping of asbestos 17 around the upper portion of the receiver. The layer of asbestos does not interfere with the introduction or removal of the receiver and is of great utility in preventing radiation of heat from the receiver.

In addition to the structures above described it is desirable to include in the coffee-pot means for indicating the level of the liquid in the space between the outer casing or jacket 1 and the inner receptacle 6. The preferred form of indicating means consists of a small float 18 and a light and slender stem 19, of wire or other material, which extends upward through a small opening in the cover over the filler 2 of the outer casing.

In the modified form of the invention illustrated in Fig. 3 I have provided an attachment adapted for use with coffee-urns of ordinary construction in which the coffee-receptacle is separated from the outer wall of the casing by a space for the reception of hot water to serve as a heat-retainer and to protect the infusion of coffee from the action of fire. The outer casing or jacket of the urn is indicated at 20, and the inner coffee-receptacle, which is preferably of earthenware, as usual, is shown at 21. An annulus extends outward from the top of the inner receptacle 21, as shown at 22, forming a cover over the space between the inner receptacle and the outer casing-wall and extended upward and outward beyond the outer casing-wall to form a seat for the attachment, generally indicated at 23. The attachment 23 is similar in many respects to the receiver described above and consists of an upper portion 24 of the same or slightly larger diameter than that of the coffee-urn and a lower reduced portion 25, which forms the receptacle for the charge of coffee. The upper portion 24 of the receiver is separated from the lower portion by a perforated percolator-plate 26, the openings in the plate being very small to insure slow passage of the water through the charge of coffee, and at one side a tube 27 extends downward from the top of the receiver and terminates beneath the percolator-plate, as shown. The lower section 25 of the receiver is open at the bottom, like the receiver above described, and is provided with a removable bottom consisting of a piece of fabric 28 and a supporting-band 29, of metal, upon which the fabric is secured. The band 29 is adapted to embrace the lower portion of the receiver quite closely and hold the fabric taut. At the top of the receiver a cover 30 of ordinary form is provided, and in order to prevent the radiation of heat from the receiver a layer of asbestos 31 is arranged outside of the upper portion of the receiver, as shown. The inner portion of the receiver or receiver proper is preferably made of blocktin on account of its non-corrosive qualities.

In using either form of embodiment of the invention the receiver must be charged with coffee by first removing the fabric bottom from the receiver and filling the space below the percolator-plate, the receiver being inverted for that purpose. The space below the percolator-plate having been supplied with the desired amount of ground coffee the bottom will be fitted upon the receiver and held in place by means of the elasticity of the band upon which the fabric is secured. The fabric being drawn taut by contact with the lower margin of the receiver affords a large area for the escape of the infusion of coffee and keeps the ground coffee spread out in a layer of approximately uniform thickness, so insuring thorough action of the hot water upon the ground coffee. As the openings in the percolator-plate are always very small, the rate of passage of water through the percolator-plate and through the ground coffee is slow, so slow, indeed, that as a rule the full strength and aroma of the coffee are exhausted by the hot water in one passage through the ground coffee. The infusion formed by the passage of the hot water through the coffee passes down through the cloth bottom of the receiver into the receptacle below, whether that receptacle be a part of an ordinary coffee-urn or of the improved coffee-pot first described.

By arranging the ground coffee in a layer of approximately uniform thickness throughout and presenting a large area for the entrance of hot water into the charge of coffee the action of hot water throughout all parts of the charge is insured and a more uniform exhaustion of the ground coffee is obtained than with the bags and conical receivers commonly employed. The infusion of coffee which passes downward into the receptacle in the lower portion of the pot or urn may be kept hot indefinitely by the hot water provided between said receptacle and the outer casing of the pot or urn without danger of burning the coffee through the direct exposure thereof to the heat of the flame by which the water is heated. In the form of the invention first described the protection of the infusion of coffee within the pot from cooling is most effective. Even the radiation from the small quantity of the liquid within the spout is prevented by the layer of hot water which surrounds the inner tube of the spout.

As little or no opportunity is given for the escape of steam from the space between the outer wall and the inner coffee-receptacle, the quantity of water between the casing-wall and receptacle is diminished very slowly and replenishment is seldom necessary. The level of the liquid in the space between the outer wall and the inner receptacle is always clearly indicated in the form of the invention first described by means of the stem 19 of the indicator, which projects upward above the top of the filler and indicates exactly the level of the water within the space between the outer wall of the pot and the inner receptacle.

By providing a tube to permit free circulation of air between the coffee-receiver and the lower portion of the inner receptacle of the coffee-pot the necessity of providing any aperture in the top of the pot for the entrance of air into the coffee-receptacle is obviated, and hence the loss of any aroma of the coffee by the escape of steam from the coffee-receiver is completely prevented.

Having thus described the construction and use of my invention, what I claim as new, and desire to secure by Letters Patent, is—

In a coffee-pot, the combination with a shell or jacket and a coffee-receptacle spaced from the inner walls of the shell and terminating at its upper end in an outward-projecting flange secured to the wall of the shell, of a percolator provided with a shoulder to engage the flange of the receptacle and having a reduced portion projecting downward below the shoulder, a foraminous plate disposed near the lower end of the percolator, a detachable filtering medium combined with the lower end of the percolator, and an air-pressure-equalizing pipe having its upper end disposed near the top of the receiver and its lower end projected into the receptacle.

In testimony that I claim the foregoing as my own I have hereto affixed my signature in the presence of two witnesses.

DANIEL H. TALBERT.

Witnesses:
    FRANK B. SINEX,
    CHARLES B. SINEX.